United States Patent
Doumuki

(10) Patent No.: US 9,692,888 B2
(45) Date of Patent: *Jun. 27, 2017

(54) SYSTEM AND METHOD FOR NETWORK SETUP OF WIRELESS DEVICE FOR HOME NETWORK

(75) Inventor: Tohru Doumuki, San Diego, CA (US)

(73) Assignees: Sony Electronics Inc., Park Ridge, NJ (US); Sony Corporation, Tokyo (JP)

(*) Notice: Subject to any disclaimer, the term of this patent is extended or adjusted under 35 U.S.C. 154(b) by 1423 days.

This patent is subject to a terminal disclaimer.

(21) Appl. No.: 11/834,158

(22) Filed: Aug. 6, 2007

(65) Prior Publication Data

US 2009/0043871 A1 Feb. 12, 2009

(51) Int. Cl.
*H04M 3/42* (2006.01)
*H04W 12/04* (2009.01)
*H04W 8/26* (2009.01)
*H04W 84/12* (2009.01)

(52) U.S. Cl.
CPC ....... *H04M 3/42161* (2013.01); *H04W 12/04* (2013.01); *H04M 3/42153* (2013.01); *H04M 3/42178* (2013.01); *H04M 2203/553* (2013.01); *H04W 8/26* (2013.01); *H04W 84/12* (2013.01)

(58) Field of Classification Search
CPC ....... H04M 2203/553; H04M 3/42153; H04M 3/42161; H04M 3/42178; H04W 12/04; H04W 84/12; H04W 8/26
USPC ................................ 709/224, 225, 226, 227
See application file for complete search history.

(56) References Cited

U.S. PATENT DOCUMENTS

| | | |
|---|---|---|
| 6,704,401 B2 | 3/2004 | Piepho et al. |
| 2004/0168081 A1 | 8/2004 | Ladas et al. |
| 2004/0242197 A1 | 12/2004 | Fontaine |
| 2005/0025103 A1 | 2/2005 | Ko et al. |
| 2005/0086328 A1 | 4/2005 | Landram et al. |
| 2005/0154913 A1* | 7/2005 | Barriga et al. ............... 713/201 |
| 2005/0239445 A1 | 10/2005 | Karaoguz et al. |
| 2005/0277412 A1 | 12/2005 | Anderson et al. |
| 2006/0023651 A1 | 2/2006 | Tsuchiuchi et al. |
| 2006/0035631 A1* | 2/2006 | White et al. .................. 455/418 |
| 2006/0080441 A1* | 4/2006 | Chen et al. .................... 709/225 |
| 2006/0184998 A1* | 8/2006 | Smith et al. ...................... 726/3 |

(Continued)

FOREIGN PATENT DOCUMENTS

| | | |
|---|---|---|
| EP | 1 487 224 A1 | 12/2004 |
| JP | 2006-042087 | 2/2006 |

(Continued)

OTHER PUBLICATIONS

Denis Chalon, Yves Durand, Bruno Richard: "An Overview of Automatic Network Configuration for IPv4 Appliances" HP Laboratories Gernoble, Sep. 28, 2001, pp. 1-16.

(Continued)

*Primary Examiner* — Khaled Kassim
(74) *Attorney, Agent, or Firm* — John L. Rogitz

(57) ABSTRACT

A network device such as a wireless network device is configured using information input from a user computer or a user telephone for a specific home network to which the device will belong. This may be accomplished by obtaining from the user account information which is sent to a configuration server that automatically sets up the device for network use without the users further direct involvement.

16 Claims, 8 Drawing Sheets

(56) References Cited

U.S. PATENT DOCUMENTS

| | | | |
|---|---|---|---|
| 2006/0251256 A1 | 11/2006 | Asokan et al. | |
| 2006/0271690 A1* | 11/2006 | Banga et al. | 709/228 |
| 2007/0019609 A1* | 1/2007 | Anjum | 370/349 |
| 2008/0195736 A1* | 8/2008 | Sekiya | 709/227 |
| 2008/0313448 A1* | 12/2008 | Doumuki | 713/1 |
| 2009/0043998 A1 | 2/2009 | Doumuki | |

FOREIGN PATENT DOCUMENTS

| | | |
|---|---|---|
| TW | 200505204 | 2/2005 |
| WO | 2006106393 | 10/2006 |

OTHER PUBLICATIONS

Günter Obiltschining, "Automatic Configuration and Service Discovery for Network Smart Devices" Electronica Embedded Conference Munich 2006, pp. 1-8.

N. Sriskanthan, D. Tendon, K.K. Lee, "Protocol for Plug and Play in Bluetooth based Home Networks" Consumer Electronics, IEEE Transactions on May 2004, vol. 50, No. 2, pp. 457.

IEEE, "Information Technology—Part 11: Wireless LAN Medium Access Control and Physical Layer specifications" IEEE Std 802, Nov. 1997, Jun. 26, 1997, pp. 62-65.

Doumuki, Tohru; "System and Method for Network Setup of Wireless Device Through a Single Interface", co-pending U.S. Appl. No. 11/834,128, filed Aug. 6, 2007.

Doumuki, Tohru; "System and Method for Network Setup of Wireless Device at Point of Sale", co-pending U.S. Appl. No. 11/818,770, filed Jun. 15, 2007.

Doumuki, "System and method for Network Setup of Wireless Device Through a Single Interface", Office Action dated Jul. 20, 2009 in co-pending U.S. Appl No. 11/834,128, filed Aug. 6, 2007.

* cited by examiner

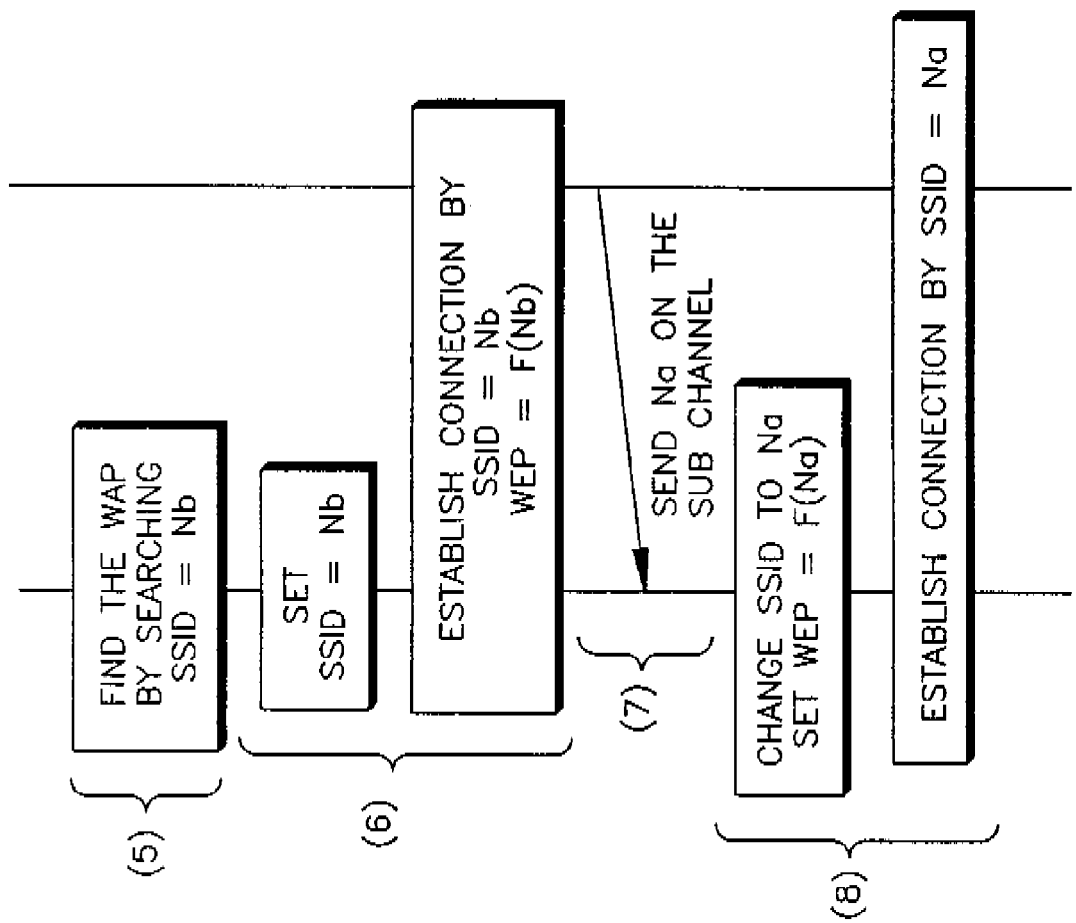

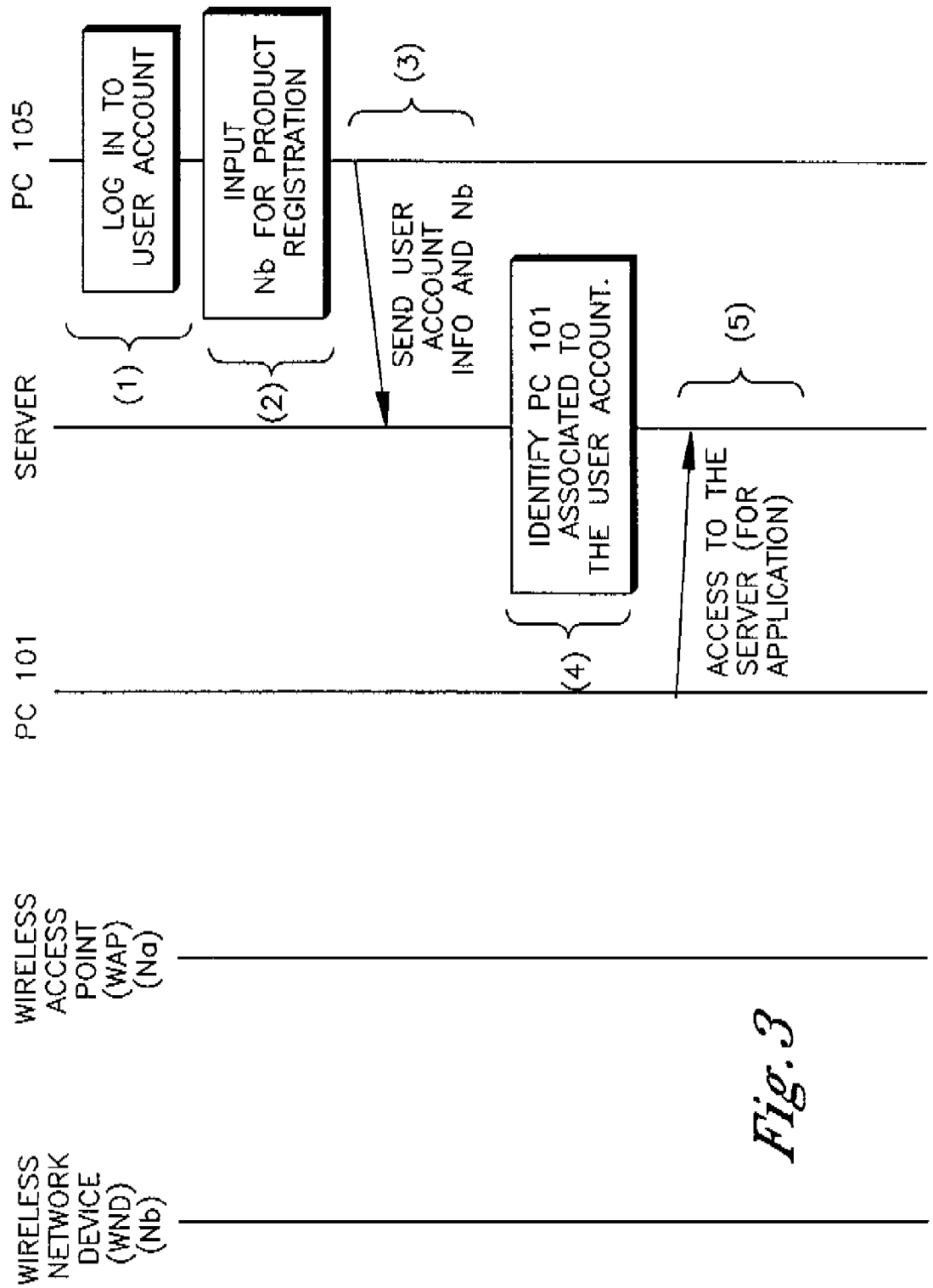

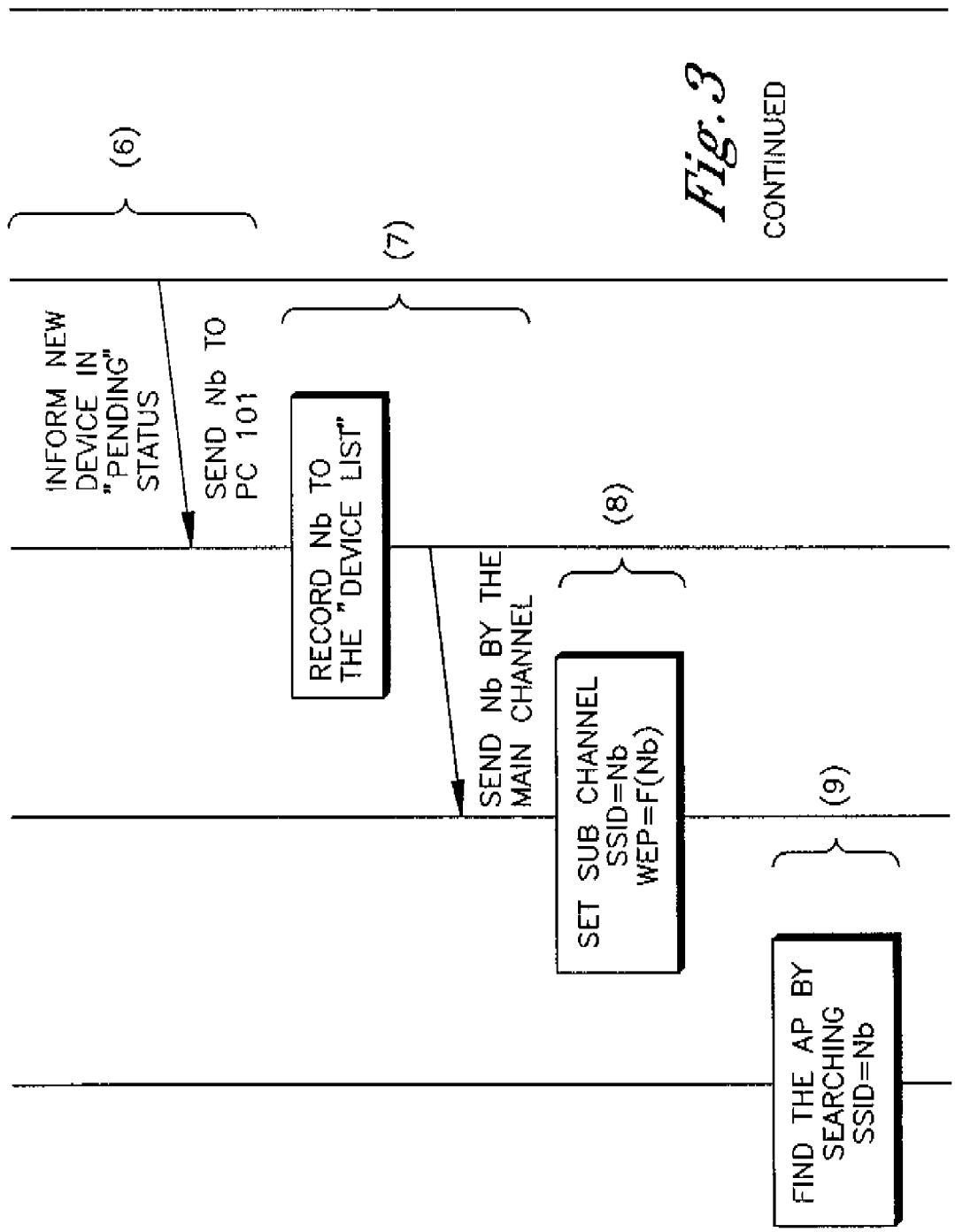

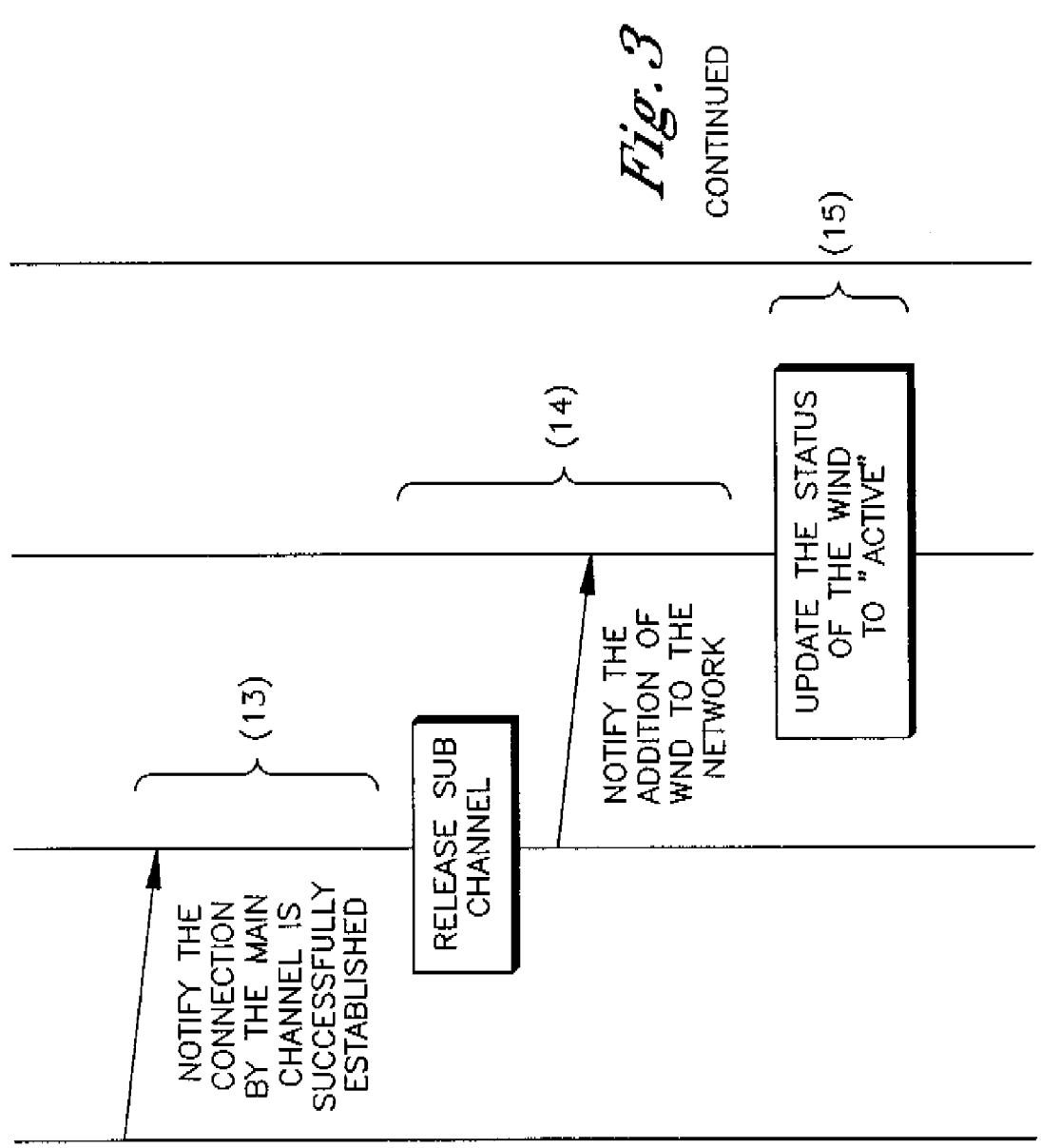

SYSTEM AND METHOD FOR NETWORK SETUP OF WIRELESS DEVICE FOR HOME NETWORK

FIELD OF THE INVENTION

The present invention relates generally to systems and methods for the network set-up of wireless devices from the wireless network itself or an external user computer.

BACKGROUND OF THE INVENTION

As network technologies are being adopted in consumer electronics (CE) products such as digital TVs, video recorders, digital still/video cameras, other wireless digital CE devices, etc, to enable these devices to communicate with other like devices in a home network, the network setup process becomes an obstacle for ease of use in these products. This is essentially because network setup is a computer-oriented procedure, which is cumbersome and unfamiliar to most non-technical users.

For example, even when a home has wireless network installed, each time a user adds a new wireless device, the user must undertake the cumbersome setup process to input network configuration. This typically includes typing in network ID and passwords sometimes referred to as a service set identifier (SSID) and wired equivalent piracy (WEP) keys, respectively.

Although this may be a common process for a PC-based network, as understood herein the following issues arise when the same process is applied to CE products. A user must have knowledge about the nature and location of network configuration information (e.g., SSID and WEP keys) that is required, as well as knowing when and how to input the information. Also, each network product must have an input/output device such as a keypad to type in the necessary information and to display confirmation. Providing such I/O devices, however, is not practical for many CE products. Moreover, because the user interface or setup menu typically varies from product to product, a non-technical user can become further confused.

Accordingly, with the above in mind users frequently encounter difficulty in connecting new devices to their home networks. As recognized herein, when a user has difficulty completing the setup process, the user typically calls customer support of the manufacturer for assistance. This, however, does not guarantee ease in identifying the cause of the difficulty so that a solution can be quickly provided over the phone, and moreover customer support is costly.

SUMMARY OF THE INVENTION

A method is disclosed for configuring a network device for a network. The network includes, at a user computer or user telecommunication device, receiving as input a device identification (ID) unique to the network device, and using the user computer or telecommunication device to provide the device ID to an Internet server. The device ID is sent from the server to a network component in the network and used as a temporary network ID to establish communication between the component and the device. The method then includes sending a main network ID from the component to the device, and subsequently using the main network ID in communication between the device and the network.

In non-limiting implementations the main network ID may be for a main channel and initially may be sent to the device on a subchannel using the temporary network ID. In some embodiments the subchannel is deactivated after communication is established with the device over the main channel. The network device can be a wireless device, in which case the temporary network ID can be a service set identifier (SSID), and the main network ID can be a SSID. A password such as a wired equivalent piracy (WEP) key can be derived as a function of the device ID.

In another aspect, a network device associated with a unique device ID input by a user from inside or outside a home network uses the device ID as a network ID to obtain a main network ID over a subchannel of a home network. The network device also sets the device ID to be the main network ID, and subsequently communicates with a main channel of the home network using the main network ID.

In still another aspect, a system includes means for providing a device ID unique to a network device. The means for providing is established by a user computer or user telecommunication apparatus. The system also has means for providing the device ID to a home network, means for communicating a main network ID to the device over the home network using the device ID as a temporary network ID, and means for subsequently using the main network ID to establish communication between the device and at least one component on the network.

DETAILED DESCRIPTION OF THE PREFERRED EMBODIMENT

Figure 1:
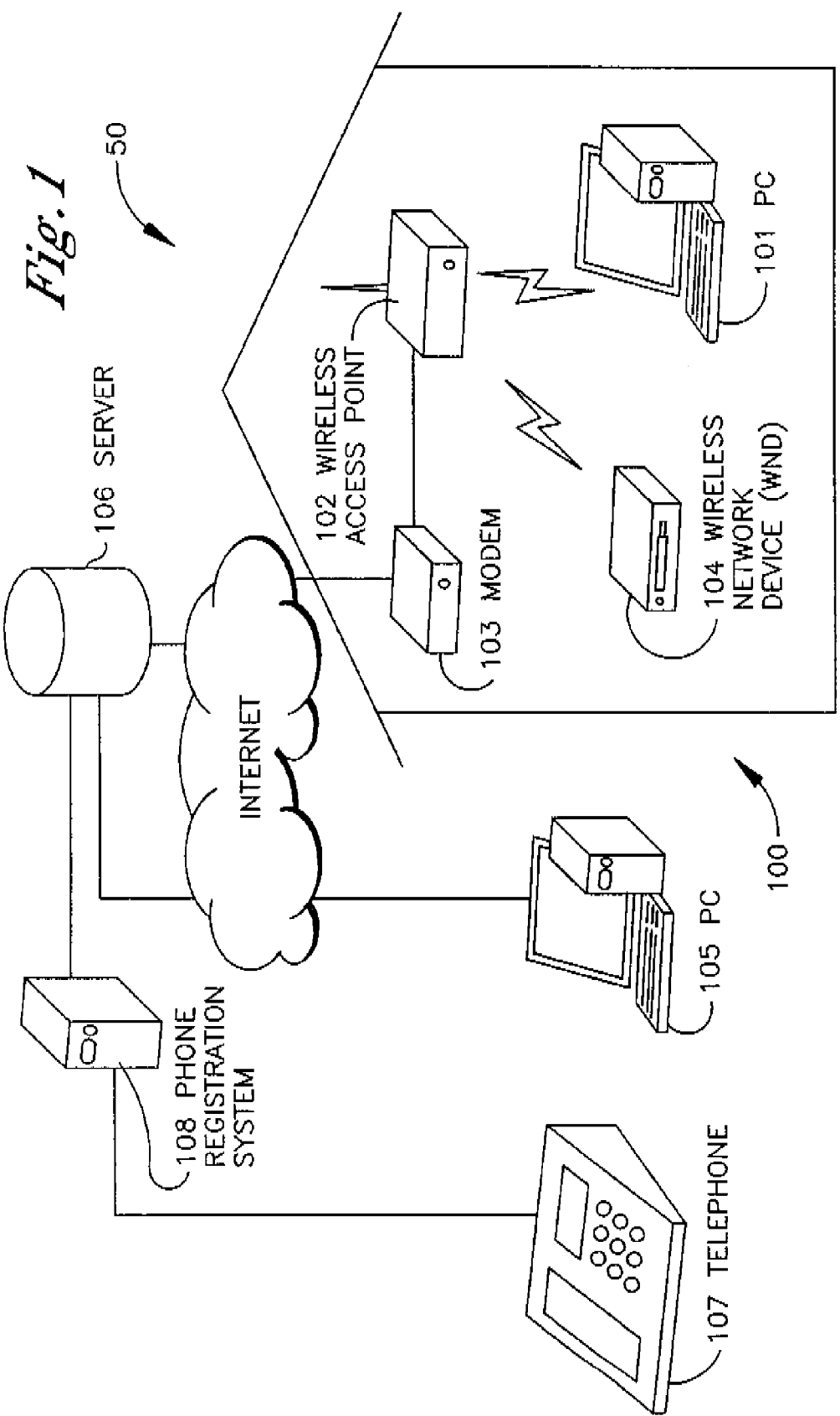
FIG. 1 is a block diagram of a non-limiting system in accordance with present principles.

Referring initially to FIG. 1, a system is shown, generally designated 50, which includes a home network, generally designated 100. The system 50 includes a user computer 101 communicating within the home network 100 using a wireless access point (WAP) 102. In turn, the WAP 102 receives data through a modem 103 that has the ability to communicate directly with a server 106. The home network 100 can also include one or more wireless network devices (WND) 104. In any case, it will readily be appreciated that the home network 100 communicates with external components, including the Internet, through the modem 103.

Additionally, FIG. 1 shows that a user computer 105 which is external to the home network 100 may be provided and may communicate directly with a server 106 over the Internet. Either user computer 101, 105 can be a users home personal computer, laptop computer, or any other device capable of bilateral communication with the server 106.

The wireless network device (WND) 104 requires wireless network access to achieve functionality. At least a unique device ID can be stored in the WND 104. Without limitation the WND 104 may be a digital still or video camera, digital music player, wireless digital TV, etc.

In addition to the user computer 105 that is external to the home network 100, the logic of FIGS. 2 and 3 below may envision use of; a telecommunication device 107 that also can be external to the home network and that has the capability to communicate with a phone registration system 108 that in turn has the capability to communicate bilaterally with the server 106.

As set forth further below, the user computer 101, external user computer 105, or telecommunication device 107 may be used to transmit data about the WND 104 to the server 106. Sales and product information (product type, unique device ID, cost, etc.) as well as user data (name, address, and other registration information) are non-limiting examples of the types of data that may be input using the user computer 101, external user computer 105, or telecommunication device 107 such as a wireless telephone.

In non-limiting embodiments the WAP 102 has a capability to communicate at least with the WND 104 over two wireless channels (main and subchannel), each of which is specified by a respective SSID and WEP key. In one implementation the SSID of the main channel may be designated "Na", and the WEP key can be calculated by a specific function F(x), which is commonly implemented in the WND 104 as well.

Figure 2:
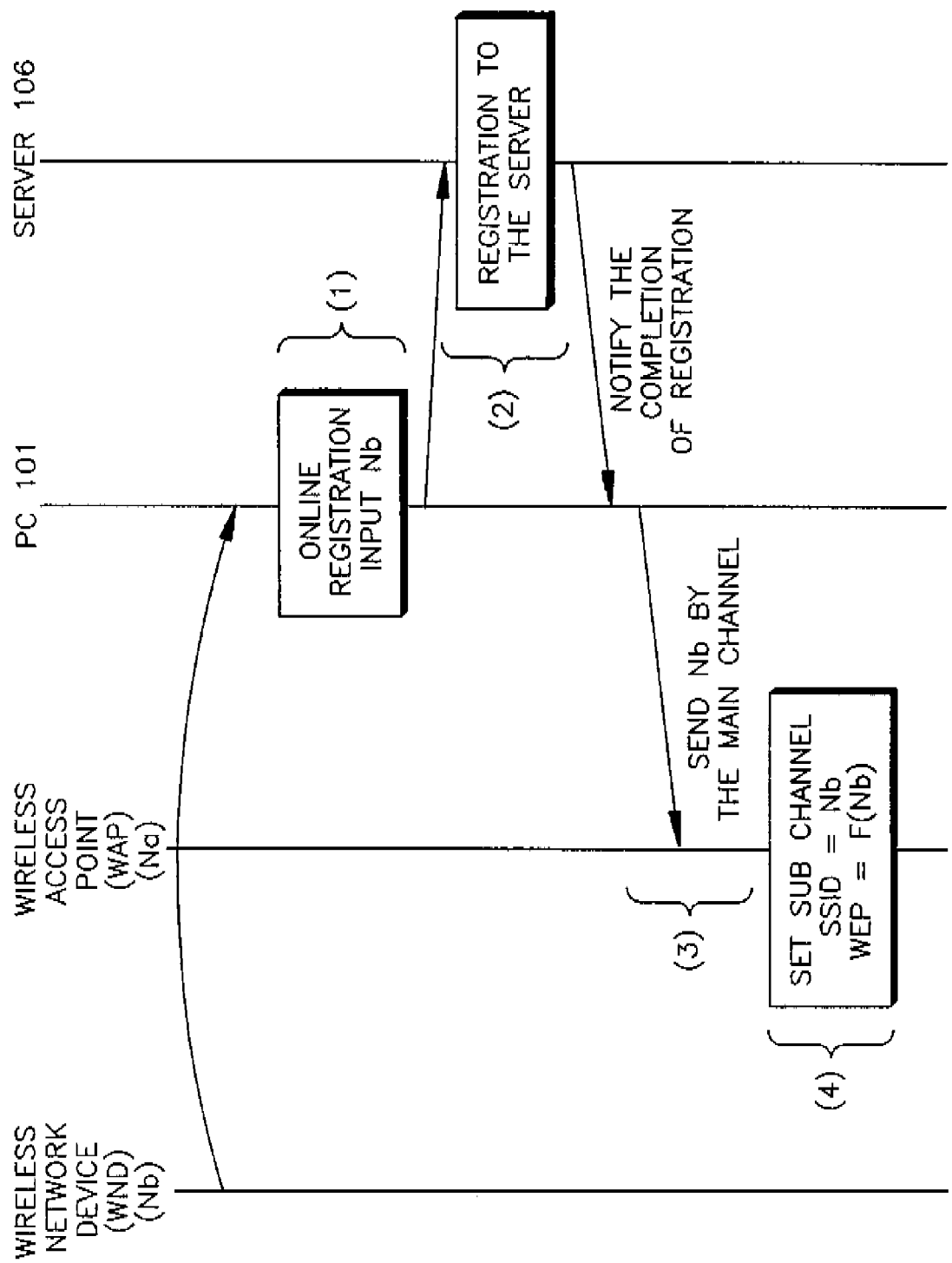
FIG. 2 is a logic chart illustrating non-limiting steps in accordance with present principles.
Figure 2:
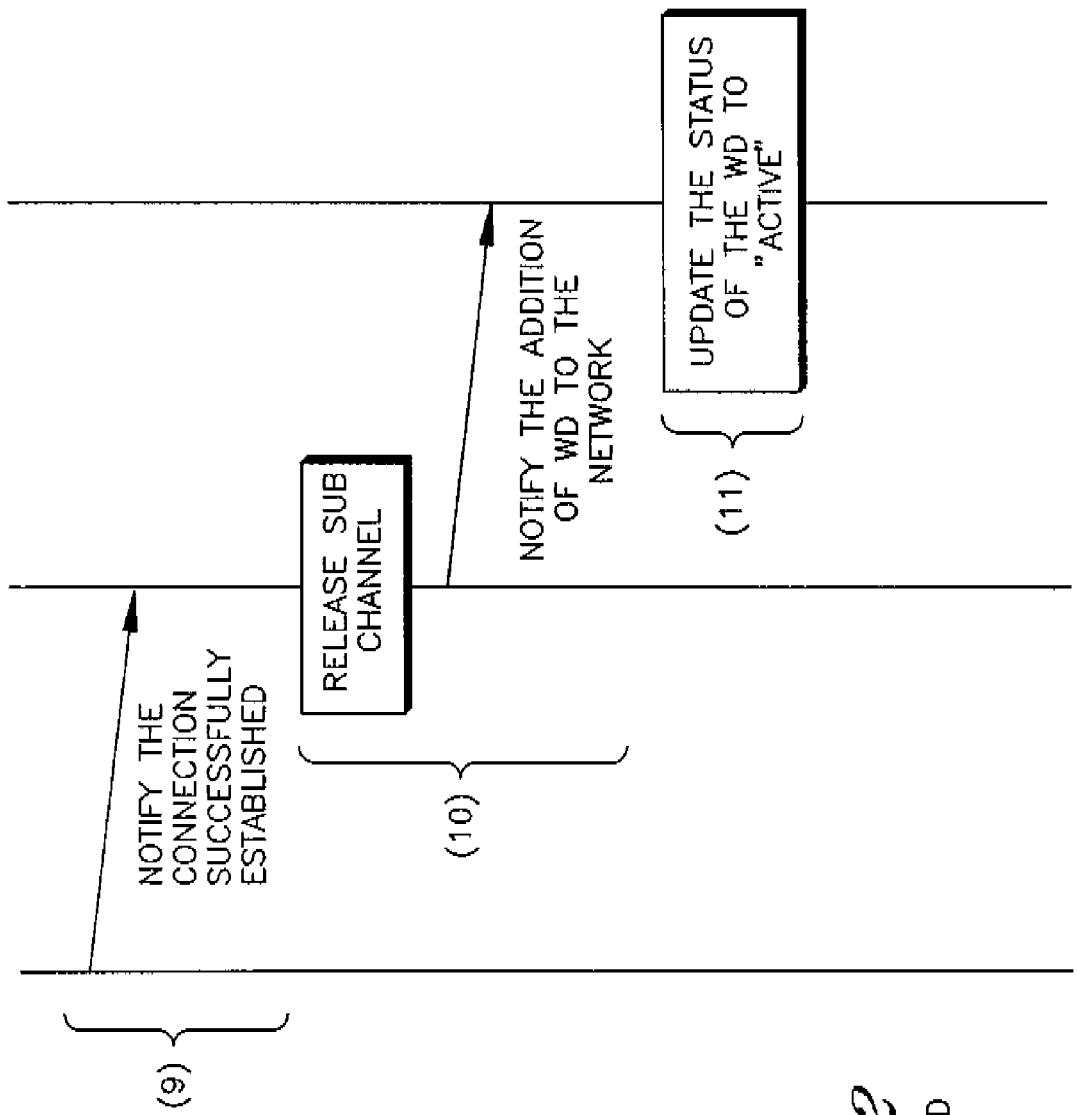
Figure 3:
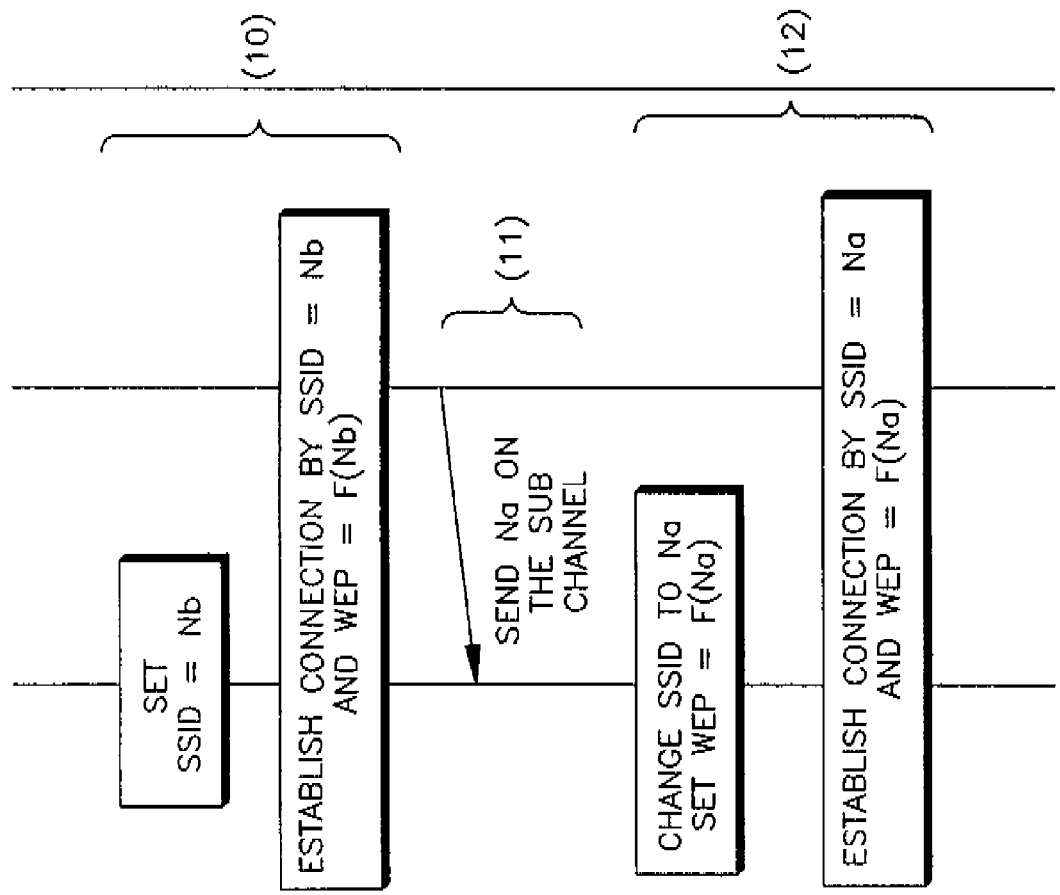
FIG. 3 is yet another logic chart illustrating non-limiting steps in accordance with present principles.

It is to be understood that without limitation the user computer 101, WND 104, external user computer 105, server 106, and phone registration system 108 may have digital processors that execute logic stored on computer-readable media such as disks or solid state media in accordance with the logic of FIG. 2 and/or FIG. 3.

As an initial matter prior to discussing the logic of FIGS. 2 and 3, a user of the home network 100 can have an account that may be obtained by registration of some network device and/or for some network service. The server 106 can store the user account information. In the following example, the user account is assumed to be associated with the user computer 101, even if a user initiates communication with the server 106 from the computer 105 or telecommunication device 107 that are external to the home network 100, and/or an application executed by any of the three devices referenced above.

With the above in mind, reference is now made to FIGS. 2 and 3, which show embodiments of logic in accordance with present principles. The WND 104 is associated with an initial temporary device identification designated herein Nb, which is unique to each product and which may be in the form of an SSID in, e.g., non-limiting wireless applications.

With specific reference to FIG. 2, the steps for registering the WND 104 from a user computer 101 inside the home network 100 are shown. At step (1), the user enters registration information from the user computer 101, and then at step (2), this information is submitted to the server 106 through the internet. The information can include the temporary device ID Nb and user account information (e.g., account name and password that among other things identify the user's home network).

Moving to step (3), the user is notified of the completion of the registration for the WND 104. The user computer 101 may record the device ID Nb to a registered device list, categorizing it as, e.g., "suspended". The user computer 101 then sends the device ID Nb to the WAP 102 over the main channel described above.

At step (4), upon receiving the device ID Nb, the WAP 102 sets the SSID of the subchannel mentioned above to be equal to the device ID Nb, also calculating the subchannel WEP key to be a function of Nb. The function used to calculate the WEP key may be a secret function commonly implemented for or by the WAP 102 and WND 104.

Proceeding to step (5), the WND 104 searches for the WAP 102 by scanning for access points in accordance with WAP scanning principles known in the art. This may be invoked by the user from a setup menu, or alternatively it may be started automatically when the power is turned on first time by the user. By scanning, the WND 104 discovers the subchannel with an SSID=Nb. Additionally, at step (6) the WND 104 also sets its SSID to be the device ID Nb and its WEP key to be the above-discussed function of the device ID Nb. As a consequence, the WND 104 can establish a wireless communication connection with the WAP 102 over the subchannel.

With the subchannel communication established, at step (7) the WAP 102 sends the SSID Na of the main channel to the WND 104 via the subchannel. Now having the main channel SSID, at step (8) the WND 104 changes its SSID to be the main channel SSID Na and also sets its WEP key to be a function of the main channel SSID Na, establishing communication with the WAP 102 through the main channel. In this way, security of the main channel SSID and WEP keys of the home network is preserved.

Completing the logic, at step (9) the WND 104 sends a message to the WAP 102 to notify the WAP 102 that communication with the WND 104 is now over the main channel with SSID=Na. Upon receiving the message, at step (10) the WAP 102 deactivates the subchannel and preferably erases the SSID of the subchannel. The WAP 102 then notifies the user computer 101 that the WND 104 is now added to the network and available for communication. If desired, at step (11) the user computer 101 can change the status of the WND 104 in the registered device list from "suspended" to "active".

Moving to FIG. 3, the steps for registering the WND 104 from an external user computer 105 outside the home network 100 are shown. At step (1), the user enters the users account information (e.g., account name and password that among other things identify the user's home network) from the external user computer 105. At step (2), the temporary device ID Nb is also input through the external user computer 105. Then, at step (3) the user account information and the temporary device ID Nb are both transferred to the server 106.

Moving to step (4), the server 106 accesses its user account database to retrieve corresponding data for the account identified by the account information received at step (3), associating the user account information received at step (3) with the user computer 101. The server 106 adds new data to the account record, specifically that a new device with device ID=Nb is in a pending status for network set up. In other words, the server 106 sets the "device registration status" to "pending", and then waits for the user to access the account from the user computer 101.

This access is shown at step (5) of FIG. 3, wherein the user by means of the user computer 101 accesses the server 106 with the user account information. In response, at step (6) the server 106 notifies the user computer 101 (or equivalently an application running thereon) that a new device is in the setup pending status, with the server delivering the temporary device ID Nb to the user computer 101.

At step (7) the user computer 101 records the device ID Nb to a registered device list, categorizing it as, e.g., "suspended". The user computer 101 also sends the device ID Nb to the WAP 102 preferably using the main channel already established with an SSID=Na.

At step (8), upon receiving the device ID Nb, the WAP 102 sets the SSID of the subchannel mentioned above to be equal to the device ID Nb, also calculating the subchannel WEP key to be a function of Nb. The function used to calculate the WEP key may be a secret function commonly implemented for or by the WAP 102 and WND 104.

Proceeding to step (9), the WND 104 searches for the WAP 102 by scanning for access points in accordance with WAP scanning principles known in the art. This may be invoked by the user from a setup menu, or alternatively it may be started automatically when the power is turned on first time by the user. By scanning, the WND 104 discovers the subchannel with an SSID=Nb. Additionally, at step (10) the WND 104 also sets its SSID to be the device ID Nb and its WEP key to be the above-discussed function of the device ID Nb. As a consequence, the WND 104 can establish a wireless communication connection with the WAP 102 over the subchannel.

With the subchannel communication established, at step (11) the WAP 102 sends the SSID Na of the main channel to the WND 104 via the subchannel. Now having the main channel SSID, at step (12) the WND 104 changes its SSID to be the main channel SSID Na and also sets its WEP key to be a function of the main channel SSID Na, establishing communication with the WAP 102 through the main channel. In this way, security of the main channel SSID and WEP keys of the home network is preserved.

Completing the logic, at step (13) the WND 104 sends a message to the WAP 102 to notify the WAP 102 that communication with the WND 104 is now over the main channel with SSID=Na. Upon receiving the message, at step (14) the WAP 102 deactivates the subchannel and preferably erases the SSID of the subchannel. The WAP 102 then notifies the user computer 101 that the WND 104 is now added to the network and available for communication. If desired, at step (15) the user computer 101 can change the status of the WND 104 in the registered device list from "suspended" to "active".

The logic of FIG. 3 may be executed using the telecommunication device 107 instead of the external user computer 105. For a user to register the WND 104 from a telecommunication device 107, the WND 104 manufacturer can provide a telecommunication system that may communicate bilaterally with the server 106 through an automated phone registration system (PRS) 108. When the telecommunication device 107 is used, the information in steps 1-3 of FIG. 3 are input using, e.g., a keypad on the telecommunications device 107.

It may now be appreciated that using the logic of FIGS. 2 and 3, advantageously the user is requested to do nothing beyond the purchase steps to add a new device to the home network other than to initially provide basic user account information using a familiar device such as a computer or telephone when first connecting the WND 104.

It is to be understood that while in the above examples the user accesses the server to learn of the new device, in other implementations the server can push the new device information to the PC without being asked. It is to be further understood that while a wireless network with SSID is described above in the non-limiting illustrative embodiment, the invention is not limited to wireless networks, but can be applied to other types of networks such as powerline or phoneline communication networks. In these cases, network identification ID is used, corresponding to SSID in the case of wireless, and it depends on each network type and can be transferred in the same way as the SSID described above. It is to be further understood that the WAP 102 may be incorporated into the user computer 101.

While the particular SYSTEM AND METHOD FOR NETWORK SETUP OF WIRELESS DEVICE is herein shown and described in detail, it is to be understood that the subject matter which is encompassed by the present invention is limited only by the claims.

What is claimed is:

1. A method for configuring a network device for a network, comprising:

at a user computer or user telecommunication device having communication access through a wireless access point, receiving from a human end user a device identification (ID) unique to the network device;

receiving at the user computer or user telecommunication device from a human user input representing registration information related to the network device including user account name and password;

using the user computer or telecommunication device, providing the device ID and registration information to an Internet server;

sending at least the device ID from the server to a network component in the network;

using the device ID as a temporary network ID to establish communication between the component and the device;

sending a main network ID from the component to the device; and subsequently using the main network ID in communication between the device and the network, wherein the main network ID is for a main channel and initially is sent to the device on a subchannel using the temporary network ID.

2. The method of claim 1, wherein the subchannel is deactivated after communication is established with the device over the main channel.

3. The method of claim 1, wherein the device is a wireless device, the temporary network ID is a service set identifier (SSID), and the main network ID is a SSID.

4. The method of claim 1, further comprising deriving at least one password as a function of the device ID.

5. The method of claim 4, wherein the password is a wired equivalent piracy (WEP) key.

6. A network device associated with a unique device ID input by a user from inside or outside a home network and executing logic comprising:

using the device ID as a network ID to obtain a main network ID over a subchannel of a home network;

setting the device ID to be the main network ID; and subsequently communicating with a main channel of the home network using the main network ID, the main channel being different from the subchannel, wherein the device ID is received by a user and sent from a user computer or telecommunication device along with registration information pertaining to the network device to the home network such that a user of the network device need do nothing beyond purchasing the network device to add the network device to the home network other than to initially provide the registration information using the user computer or telecommunications device.

7. The device of claim 6, wherein the device is a wireless device and the main network ID is a service set identifier (SSID).

8. The device of claim 6, wherein the subchannel is deactivated after communication is established with the device using the main network ID.

9. The device of claim 6, wherein the device derives at least one password as a function of the device ID.

10. The method of claim 9, wherein the password is a wired equivalent piracy (WEP) key.

11. A system, comprising:

means for providing a device ID unique to a network device, the means for providing being established by one of: a user computer, or user telecommunication apparatus, the means for providing also providing registration information pertaining to the network device, the registration information including an account identification, the user computer or user telecommunication apparatus having input keys arranged thereon generating signals, responsive to user manipulation, representative of the registration information;

means for providing the device ID and registration information to a home network;

means for communicating a main network ID to the device over the home network using the device ID as a temporary network ID; and means for subsequently using the main network ID to establish communication between the device and at least one component on the network.

12. The system of claim 11, wherein the device is a wireless device and the main network ID is a SSID.

13. The system of claim 11, wherein the main network ID is for a main channel and initially is sent to the device on a subchannel using the device ID as a temporary network ID.

14. The system of claim 13, wherein the subchannel is deactivated after communication is established with the device using the main network ID.

15. The system of claim 11, wherein the device and the network derive at least one password as a function of the device ID.

16. The system of claim 15, wherein the password is a wired equivalent piracy (WEP) key.

* * * * *